US009916078B2

(12) United States Patent
Kim et al.

(10) Patent No.: US 9,916,078 B2
(45) Date of Patent: *Mar. 13, 2018

(54) MOBILE TERMINAL

(71) Applicant: LG ELECTRONICS INC., Seoul (KR)

(72) Inventors: Jaichul Kim, Seoul (KR); Seungil Lee, Seoul (KR); Chulbae Lee, Seoul (KR); Sukho Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 109 days.

This patent is subject to a terminal disclaimer.

(21) Appl. No.: 14/713,892

(22) Filed: May 15, 2015

(65) Prior Publication Data
US 2015/0248209 A1   Sep. 3, 2015

Related U.S. Application Data

(63) Continuation of application No. 13/950,211, filed on Jul. 24, 2013, now Pat. No. 9,063,583.

(30) Foreign Application Priority Data

Feb. 8, 2013  (KR) .................. 10-2013-0014680

(51) Int. Cl.
G06F 3/041 (2006.01)
G06F 3/0488 (2013.01)
(Continued)

(52) U.S. Cl.
CPC .............. *G06F 3/0488* (2013.01); *G06F 3/03* (2013.01); *G06F 3/041* (2013.01); *G06K 9/00087* (2013.01); *H04M 1/236* (2013.01)

(58) Field of Classification Search
CPC ................................ G06F 3/03; H04M 1/236
(Continued)

(56) References Cited

U.S. PATENT DOCUMENTS 3,206,953 A   9/1965 Atkinson
5,009,009 A   4/1991 Stinson
(Continued)

FOREIGN PATENT DOCUMENTS

CN  101064891 A  10/2007
JP  2009-129435 A  6/2009
(Continued)

*Primary Examiner* — Prabodh M Dharia
(74) *Attorney, Agent, or Firm* — Birch, Stewart, Kolasch & Birch, LLP

(57) ABSTRACT

A mobile terminal includes a terminal body having a front surface and a rear surface, an input unit disposed at the rear surface to sense an input of a control command and a controller configured to process an input applied to the input unit. The input unit includes a first button portion exposed at an outside of the terminal body at the rear surface of the terminal body and configured to receive a push input corresponding to a first function and a second button portion surrounding the first button portion and configured to receive a push input corresponding to a second function different from the first function, the second button portion including keys disposed adjacent the first button portion.

24 Claims, 19 Drawing Sheets

Figure 1:
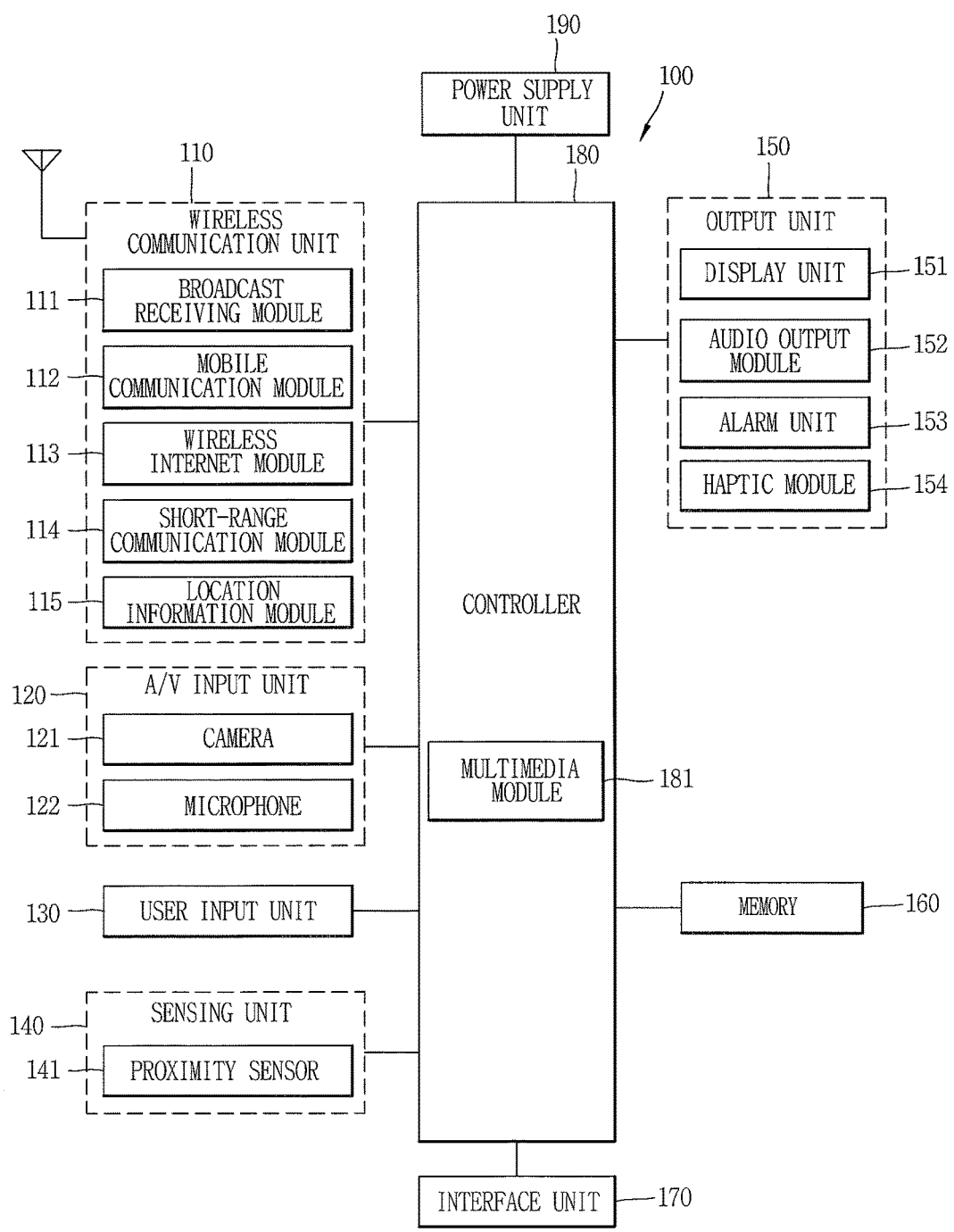

(51) Int. Cl.
   *H04M 1/23*  (2006.01)
   *G06F 3/03*  (2006.01)
   *G06K 9/00*  (2006.01)

(58) Field of Classification Search
   USPC ....... 345/156–184; 200/302.2, 512; 455/566, 455/575.1, 575.4
   See application file for complete search history.

(56) References Cited

U.S. PATENT DOCUMENTS

| | | | |
|---|---|---|---|
| 5,615,384 | A | 3/1997 | Allard et al. |
| 6,160,540 | A * | 12/2000 | Fishkin .................. A63F 13/00 345/156 |
| 6,349,220 | B1 | 2/2002 | Prior et al. |
| 6,415,165 | B1 | 7/2002 | Ishigami |
| 6,653,584 | B1 * | 11/2003 | Chen ........................ H01H 9/06 200/321 |
| 6,668,196 | B1 | 12/2003 | Villegas et al. |
| 6,681,124 | B2 | 1/2004 | Prior et al. |
| 6,944,472 | B1 | 9/2005 | Ishigami |
| 6,965,783 | B2 | 11/2005 | Pirkola et al. |
| 7,031,760 | B2 | 4/2006 | Cheng |
| 7,369,119 | B2 | 5/2008 | Davani et al. |
| 7,551,945 | B2 | 6/2009 | Okada et al. |
| 7,800,592 | B2 | 9/2010 | Kerr et al. |
| 8,005,506 | B2 | 8/2011 | Choi et al. |
| 8,577,427 | B2 | 11/2013 | Serota |
| 8,706,818 | B2 | 4/2014 | Krzyzanowski et al. |
| 8,774,879 | B2 | 7/2014 | Hong et al. |
| 2001/0041598 | A1 | 11/2001 | Yoshino et al. |
| 2004/0085188 | A1 | 5/2004 | Minemura |
| 2004/0116167 | A1 | 6/2004 | Okuzako et al. |
| 2004/0248626 | A1 | 12/2004 | Cheng |
| 2005/0220325 | A1 * | 10/2005 | Kinsella .............. G06F 3/03543 382/115 |
| 2006/0128407 | A1 * | 6/2006 | Kim .................. H04M 1/72555 455/466 |
| 2006/0131157 | A1 | 6/2006 | Chadha |
| 2006/0181521 | A1 * | 8/2006 | Perreault ............... G06F 1/1613 345/173 |
| 2007/0037618 | A1 | 2/2007 | Lee |
| 2007/0090918 | A1 | 4/2007 | Engstrom et al. |
| 2007/0221041 | A1 | 9/2007 | Oh |
| 2007/0222755 | A1 | 9/2007 | Kajihara |
| 2007/0246341 | A1 | 10/2007 | Kim et al. |
| 2008/0147803 | A1 | 6/2008 | Krzyzanowski et al. |
| 2008/0182632 | A1 * | 7/2008 | Jung .................. H04M 1/0208 455/575.1 |
| 2008/0307315 | A1 | 12/2008 | Sherman et al. |
| 2008/0316117 | A1 * | 12/2008 | Hill ........................ H01Q 1/243 343/702 |
| 2009/0201260 | A1 | 8/2009 | Lee et al. |
| 2009/0226050 | A1 * | 9/2009 | Hughes .................. A45C 13/18 382/124 |
| 2009/0315846 | A1 | 12/2009 | Kim |
| 2010/0053083 | A1 | 3/2010 | Hwang |
| 2010/0058253 | A1 * | 3/2010 | Son ........................ G06F 1/1616 715/863 |
| 2010/0113107 | A1 | 5/2010 | Hasegawa et al. |
| 2010/0124956 | A1 | 5/2010 | Hong et al. |
| 2010/0207722 | A1 * | 8/2010 | Rutledge ............... B60R 25/246 340/5.51 |
| 2010/0225607 | A1 * | 9/2010 | Kim ........................ G06F 3/042 345/173 |
| 2010/0289760 | A1 * | 11/2010 | Jonoshita .............. G06F 1/1626 345/173 |
| 2011/0012851 | A1 | 1/2011 | Ciesla et al. |
| 2011/0047494 | A1 * | 2/2011 | Chaine .................. G06F 3/04883 715/769 |
| 2011/0108707 | A1 | 5/2011 | Cui et al. |
| 2011/0131521 | A1 * | 6/2011 | Cho ........................ G06F 3/016 715/772 |
| 2012/0050975 | A1 | 3/2012 | Garelli et al. |
| 2012/0080521 | A1 * | 4/2012 | Brown .................... G06F 21/32 235/382 |
| 2012/0098639 | A1 * | 4/2012 | Ijas ..................... G06F 3/04883 340/5.51 |
| 2012/0133573 | A1 * | 5/2012 | Yoon .................... G06F 1/1622 345/1.1 |
| 2012/0225702 | A1 * | 9/2012 | Ladouceur ............ G06F 3/0213 455/575.1 |
| 2012/0227006 | A1 | 9/2012 | Amm |
| 2013/0069883 | A1 | 3/2013 | Oga |
| 2013/0082938 | A1 | 4/2013 | Huang |
| 2013/0307818 | A1 * | 11/2013 | Pope ....................... G06F 3/044 345/174 |
| 2014/0082564 | A1 * | 3/2014 | Kouda ................ H04N 5/23245 715/835 |
| 2014/0098050 | A1 * | 4/2014 | Endo ..................... G06F 3/0487 345/173 |
| 2014/0285955 | A1 * | 9/2014 | Matsumoto ........... G06F 1/1626 361/679.01 |
| 2017/0168637 | A1 * | 6/2017 | Hobson ................ G06F 3/0416 |

FOREIGN PATENT DOCUMENTS

| | | |
|---|---|---|
| JP | 2012-242851 A | 12/2012 |
| JP | 2013-81427 A | 5/2013 |
| KR | 10-2005-0028638 A | 3/2005 |
| KR | 10-2006-0080060 A | 7/2006 |
| KR | 10-2008-0102503 A | 11/2008 |
| KR | 10-2009-0026977 A | 3/2009 |
| KR | 10-2009-0078303 A | 7/2009 |
| KR | 10-2010-0086639 A | 8/2010 |
| KR | 10-2010-0100459 A | 9/2010 |
| KR | 10-0983902 B1 | 9/2010 |
| KR | 20-0450989 Y1 | 11/2010 |
| KR | 10-2010-0127929 A | 12/2010 |
| KR | 20-2011-0001788 U | 2/2011 |
| KR | 10-1063939 B1 | 9/2011 |
| KR | 10-1085239 B1 | 11/2011 |
| KR | 10-2011-0139107 | 12/2011 |
| KR | 10-1107422 B1 | 1/2012 |
| KR | 10-2012-0045697 A | 5/2012 |
| KR | 10-2012-0068259 A | 6/2012 |
| KR | 10-2012-0138983 A | 12/2012 |
| KR | 10-1227949 B1 | 1/2013 |
| KR | 10-2013-0025555 A | 3/2013 |
| KR | 10-2013-0045111 A | 5/2013 |
| KR | 10-2014-0003953 A | 1/2014 |

* cited by examiner (a)

(b)

MOBILE TERMINAL

CROSS-REFERENCE TO RELATED APPLICATION

This application is a continuation of application Ser. No. 13/950,211, filed on Jul. 24, 2013, which claims the benefit of priority of Korean Patent Application No. 10-2013-0014680, filed on Feb. 8, 2013, which are herein expressly incorporated by reference in their entirety.

BACKGROUND OF THE INVENTION

Field of the Invention

The present disclosure relates to a mobile terminal having a user input unit for receiving a control command.

Description of Related Art

Terminals can be classified into two types, such as a mobile/portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player.

Various new attempts have been made for the multimedia devices in the aspect of hardware or software in order to implement such complicated functions. For example, a user interface environment is provided in order for users to easily and conveniently retrieve or select functions.

Also, many users have their mobile terminals to express their own personalities, and accordingly, various designs are required for the mobile terminal. Such designs may also include structural changes and improvements for the user to more conveniently use the mobile terminal. A manipulation unit may be considered as one of such structural changes and improvements.

However, a manipulation unit provided additionally from the touch screen deteriorates the slimness and simple design of the terminal. Furthermore, there exists a problem such as reducing a display area due to the manipulation unit at a lateral surface of the terminal. Accordingly, a new structure of input method capable of solving such a problem may be taken into consideration.

BRIEF SUMMARY OF THE INVENTION

An object of the present disclosure is to provide a mobile terminal capable of receiving a new type of user input which is different from the related art.

Another object of the present disclosure is to provide a mobile terminal to which new design can be applied on a lateral surface of the terminal.

In order to accomplish the foregoing objective, a mobile terminal associated with the present disclosure may include a terminal body having a front surface and a rear surface, a user input unit disposed at the rear surface to sense an input of a control command, and a controller configured to process an input manipulation applied to the user input unit, wherein the user input unit includes a first button portion exposed to the outside from the rear surface to receive a push input of a first function, and a second button portion provided with keys disposed at both sides around the first button portion to receive a push input of a second function different from the first function.

Furthermore, according to the present disclosure, there is disclosed a mobile terminal including a terminal body provided with a front surface and a rear surface and lengthily formed in the length direction, a display unit disposed at the front surface and formed to display visual information, and a user input unit formed to sense an input of a control command, wherein the user input unit is overlapped with the display unit in a thickness direction of the body and exposed to the rear surface rather than the lateral surface to remove a groove formed by the user input unit at a lateral surface of the body along the length direction.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a block diagram illustrating a mobile terminal associated with an embodiment of the present disclosure;

FIGS. 2A through 2C are conceptual views illustrating an operation implemented by the present disclosure;

FIG. 3A is a front perspective view illustrating an example of a mobile terminal associated with the present disclosure;

FIG. 3B is a rear perspective view illustrating a mobile terminal illustrated in FIG. 3A;

FIG. 4 is an exploded view illustrating the mobile terminal of FIG. 3B;

FIGS. 5A and 5B are a detailed exploded view and a cross-sectional view illustrating a rear surface input unit in FIG. 4;

FIGS. 6A and 6B are a detailed exploded view and a cross-sectional view illustrating a rear surface input unit according to another embodiment of the present disclosure;

FIGS. 7A and 7B are a front view illustrating the mobile terminal of FIG. 3A and conceptual views illustrating modified examples of a lateral surface thereof;

FIG. SA is a plan view illustrating another example of a mobile terminal associated with the present disclosure;

FIG. 8B is a side view illustrating still another example of a mobile terminal associated with the present disclosure;

FIGS. 9 through 11 are conceptual views illustrating another example of an operation implemented by the mobile terminal of FIG. 3B;

FIGS. 12A through 12E are rear views illustrating a mobile terminal associated with another embodiment of the present disclosure;

FIG. 13 is a cross-sectional view illustrating the mobile terminal of FIG. 12A;

FIGS. 14A and 14B are conceptual views illustrating a user interface associated with an interlocking between the rear input unit and the display unit; and FIG. 15 is a conceptual view illustrating a user interface associated with an indicator displayed on the display unit.

DETAILED DESCRIPTION OF THE INVENTION

Hereinafter, a mobile terminal associated with the present disclosure will be described in more detail with reference to the accompanying drawings. This specification employs like/similar reference numerals for like/similar components irrespective of different embodiments, so they all will be understood by the first description. The expression in the singular form in this specification will cover the expression in the plural form unless otherwise indicated obviously from the context.

A mobile terminal disclosed herein may include a portable phone, a smart phone, a laptop computer, a digital broadcast terminal, personal digital assistants (PDA), a portable multimedia player (PMP), a navigation, and the like.

FIG. 1 is a block diagram illustrating a mobile terminal associated with an embodiment of the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes an image frame, such as still picture or video, obtained by an image sensor in a video phone call or image capturing mode. The processed image frame may be displayed on a display module 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display module 151, an audio output module 152, an alarm unit 153, a haptic module 154, and the like.

The display module 151 may display (output) information processed in the mobile terminal 100. For example, when the mobile terminal 100 is in a phone call mode, the display module 151 may display a User Interface (UI) or a Graphic User Interface (GUI) associated with a call. When the mobile terminal 100 is in a video call mode or image capturing mode, the display module 151 may display a captured image and/or received image, a UI or GUI.

The display module 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display module 151 of the terminal body.

The display module 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display module 151 and a touch sensitive sensor (referred to as a "touch sensor") have an interlayer structure, the structure may be referred to as a "touch screen". The display module 151 may be used as an input device rather than an output device. The touch sensor may be implemented as a touch film, a touch sheet, a touch pad, and the like.

The touch sensor may be configured to convert changes of a pressure applied to a specific part of the display module 151, or a capacitance occurring from a specific part of the display module 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display module 151 has been touched.

Referring to FIG. 1, a proximity sensor 141 may be arranged at an inner region of the portable terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display module 151 or the audio output unit 152, the display module 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the portable terminal 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180.

Various embodiments described herein may be implemented in a computer-readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Considering the user input unit 130 again, according to the present disclosure, the user input unit 130 may be displayed at a rear surface of the terminal such that a front display may be formed with a larger sized screen. Hereinafter, a detailed structure in which the user input unit 130 is disposed at a rear surface thereof and an operation implemented by the user input unit 130 will be described in more detail.

Figure 2A:
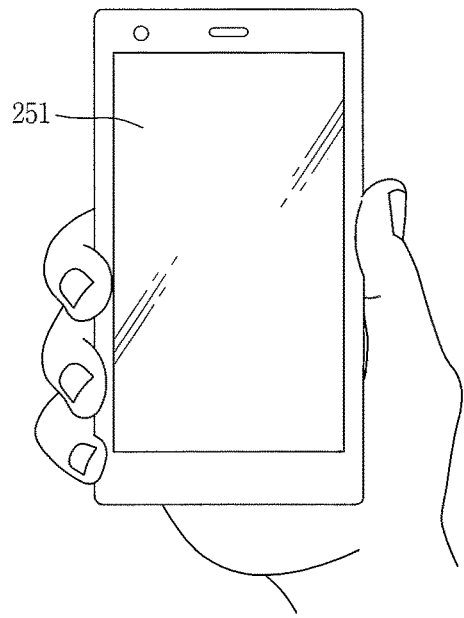
Figure 2B:
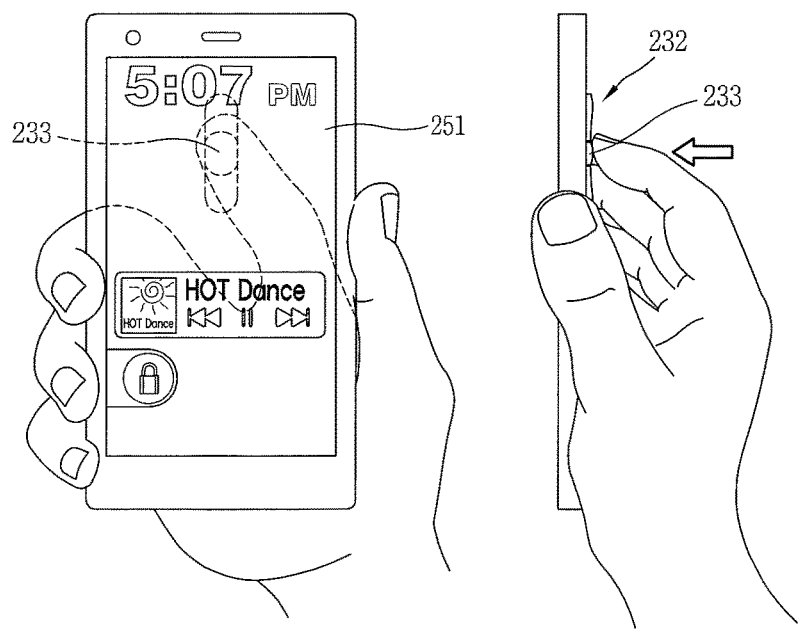
Figure 2C:
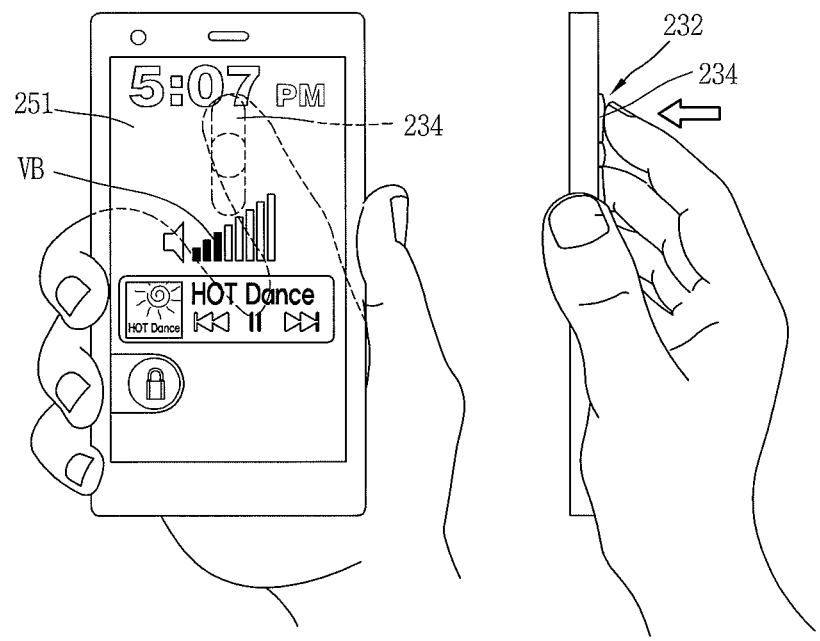

FIGS. 2A through 2C are conceptual views illustrating an operation implemented by the present disclosure.

Referring to FIG. 2A, the terminal has a display unit 251 disposed at one surface of the body, for example, a front surface thereof. A graphic user interface (GUI) of an application currently being implemented may be displayed on the display unit 251, and the display unit 251 may have a touch sensor for sensing a touch input to allow a touch input to the GUI. The display unit 251 may display visual information implemented in the form of images, text, icons and the like such as the GUI, but as illustrated in the drawing it may be switched to a deactivated state when a predetermined period of time has passed or when receiving a specific control command. FIG. 2A illustrate such a state in which the display unit 251 is deactivated during the execution of a music reproduction application.

Referring to FIG. 2B, a rear surface input unit 232 is disposed on the other surface of the body, for example, a rear surface thereof. A control command for the display unit 251 is received from the rear surface input unit 232. More specifically, when a push input is applied to a button 233 on the rear surface input unit 232, the display unit 251 is switched to an activated state. In other words, the rear surface input unit 232 may be a power key for turning on or off the display unit 251. Accordingly, the on/off of the terminal itself may be carried out by the button 233. According to the drawing, the GUI of the music reproduction application is displayed while activating the display unit 251.

Referring to FIG. 2C, when a push input is applied to another button 234 of the rear surface input unit 232 in the state of FIG. 2B, volume is adjusted by the manipulation of the another button 234 while displaying a volume bar (VB). However, the present disclosure may not be necessarily limited to the process, and a push input to the another button 234 of the rear surface input unit 232 may be also an input for volume adjustment in the state of FIG. 2A.

According to the above illustration, the user can enter a control command on the rear surface of the terminal in a push form while looking at the display unit 251. Consequently, the rear surface input unit on a rear surface of the terminal is formed to receive a push input to perform the role of a power key and a volume key of the terminal according to circumstances.

Figure 3A:
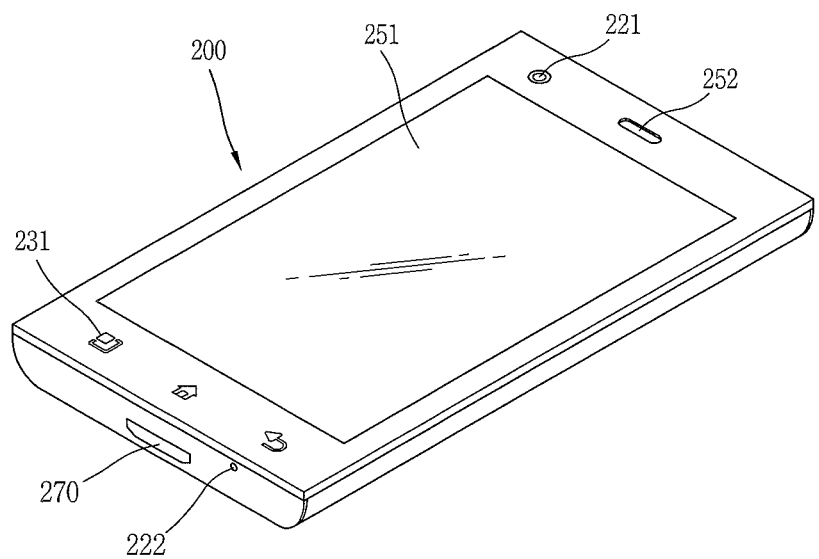
Figure 3B:
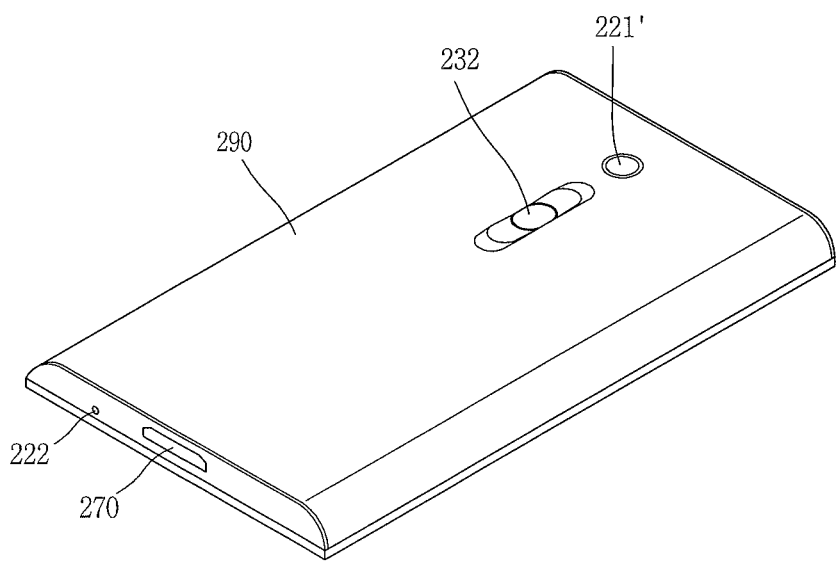

Hereinafter, the hardware configuration of a mobile terminal performing the operation of FIGS. 2A through 2C will be described in more detail. FIG. 3A is a front perspective view illustrating an example of a mobile terminal associated with the present disclosure, and FIG. 3B is a rear perspective view illustrating a mobile terminal illustrated in FIG. 3A.

The mobile terminal 200 disclosed herein is provided with a bar-type terminal body. However, the present disclosure is not only limited to this type of terminal, but also applicable to various structures of terminals such as slide type, folder type, swing type, swivel type, and the like, in which two and more bodies are combined with each other in a relatively movable manner.

The body includes a case (casing, housing, cover, etc.) forming an appearance of the terminal. In this embodiment, the case may be divided into a front case 201 and a rear case 202 (refer to FIG. 4). Various electronic components may be incorporated in a space formed between the front case 201 and the rear case 202. At least one middle case may be additionally disposed between the front case 201 and the rear case 202.

The cases may be formed by injection-molding a synthetic resin or may be also formed of a metal material such as stainless steel (STS), titanium (Ti), or the like.

A display module 251, an audio output module 252, a camera module 221, and the like may be mostly disposed at the front case 201. An interface 270 and the like may be disposed lateral surfaces of the front case 201 and rear case 202.

The display unit 251 occupies most of a main surface of the front case 201. In other words, the display unit is disposed at a front surface of the terminal, and formed to display visual information. The audio output module 252 and camera module 221 are disposed at a region adjacent to one of both ends of the display module 251, and the front surface input unit 231 and microphone 222 are disposed at a region adjacent to the other end.

The front surface input unit 231 may include a plurality of manipulation units as an example of the user input unit 130 (refer to FIG. 1). The manipulation units may be commonly designated as a manipulating portion, and any method may be employed if it is a tactile manner allowing the user to perform manipulation with a tactile feeling. According to this embodiment, the front surface input unit 231 is configured with a touch key. However, the present disclosure may not be necessarily limited to this, and a push key may be added to the front surface input unit 231.

Furthermore, the display unit 251 may form a touch screen along with a touch sensor, and in this case the touch screen may be a user input unit. Through this, it may be possible to have a configuration with no front surface input unit on a front surface of the terminal. In this case, a mobile terminal may be configured such that an input manipulation to the terminal body is enabled only through the display unit 251 and rear surface input unit 232.

Referring to FIG. 3B, a camera module 221' may be additionally mounted on a rear surface of the terminal body, namely, the rear case 202. The camera module 221' has an image capturing direction, which is substantially opposite to the direction of the camera module 221 (refer to FIG. 3A), and may have a different number of pixels from that of the camera module 221.

For example, it is preferable that the camera module 221 has a relatively small number of pixels enough not to cause a difficulty when the user captures his or her own face and sends it to the other party during a video call or the like, and the camera module 221' has a relatively large number of pixels since the user often captures a general object that is not sent immediately. The camera modules 221, 221' may be provided in the terminal body in a rotatable and popupable manner.

Furthermore, a flash and a mirror may be additionally disposed adjacent to the camera module 221'. The flash illuminates light toward an object when capturing the object with the camera module 221'. The mirror allows the user to look at his or her own face, or the like, in a reflected way when capturing himself or herself (in a self-portrait mode) by using the camera module 221'.

An audio output module (not shown) may be additionally disposed on a rear surface of the terminal body. The audio output module on a rear surface thereof together with the audio output module 252 (refer to FIG. 3A) at a front surface thereof can implement a stereo function, and it may be also used to implement a speaker phone mode during a phone call.

A power supply unit 290 for supplying power to the mobile terminal 200 may be mounted on the terminal body. The power supply unit 290 may be configured so as to be incorporated in the terminal body, or directly detachable from the outside of the terminal body.

According to the drawing, the rear surface input unit 232 is disposed on a rear surface of the terminal body. The rear surface input unit 232 may be located at a lower portion of the camera module 221', for example.

The rear surface input unit 232 may be manipulated to receive a command for controlling the operation of the mobile terminal 200, and the input content may be set in various ways. For example, the rear surface input unit 232 may be used to receive a command, such as power on/off, start, end, scroll, or the like, and receive a command, such as controlling a volume level being outputted from the audio output module 252, or switching into a touch recognition mode of the display module 251.

Figure 4:
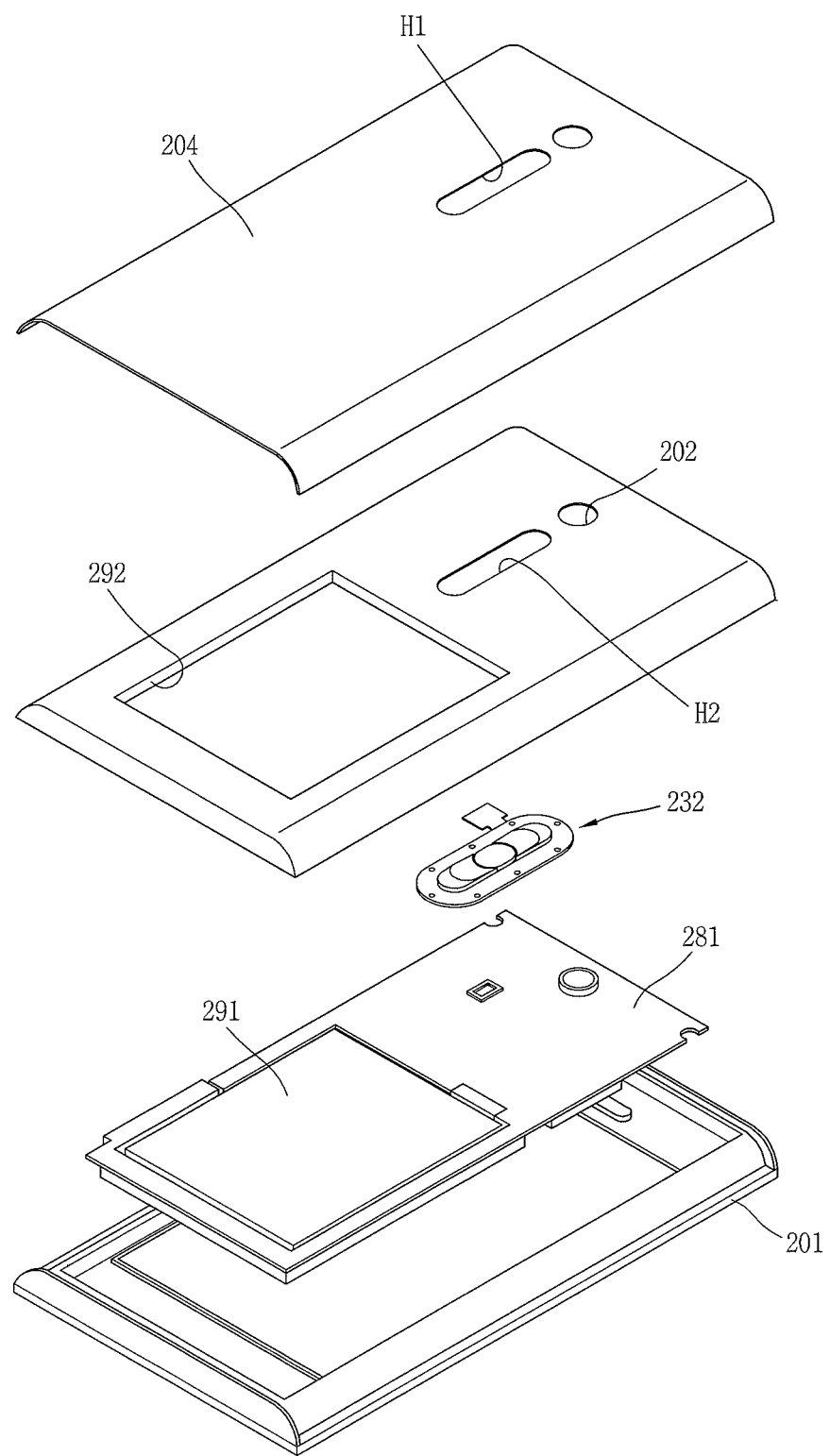
Figure 5A:
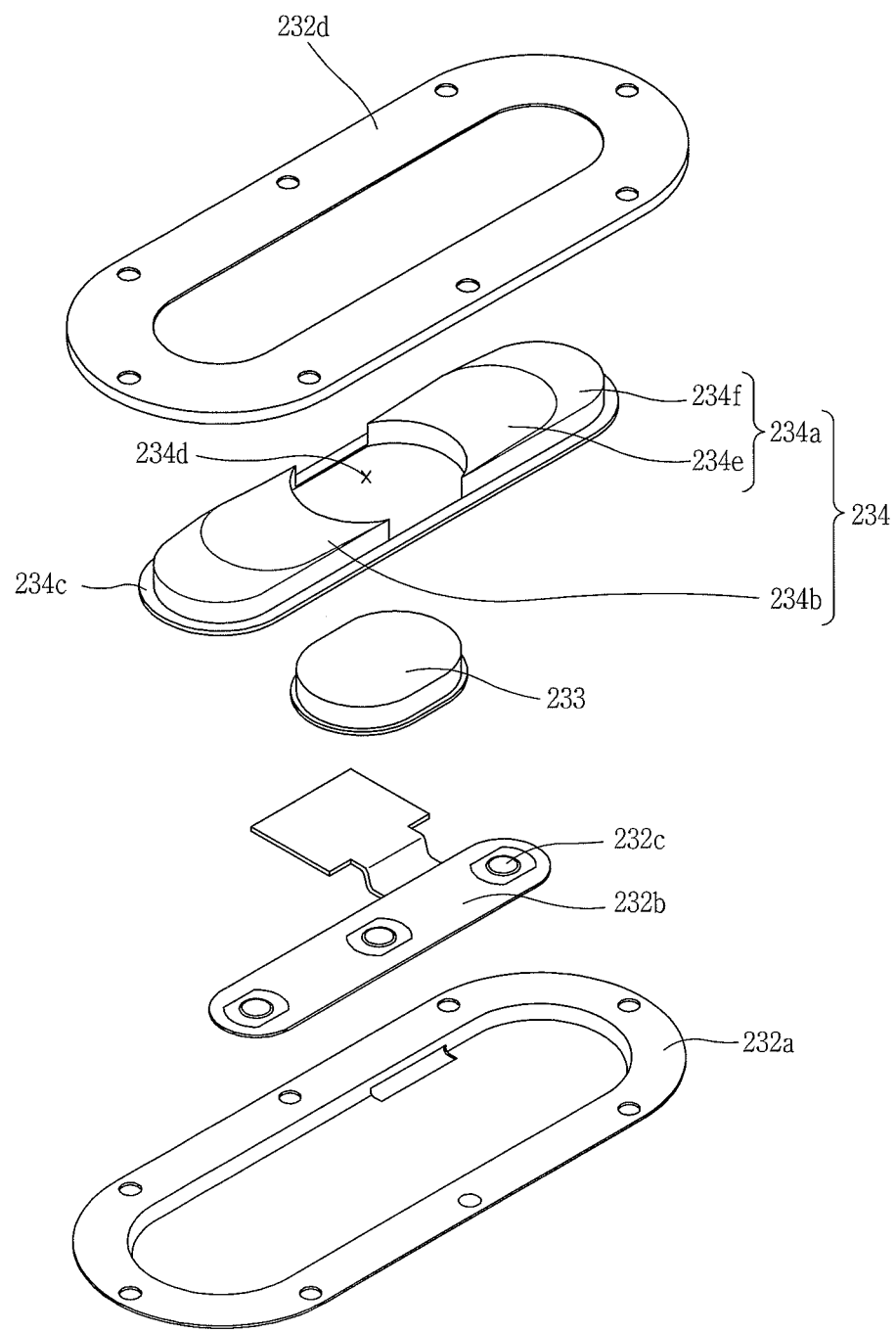
Figure 5B:
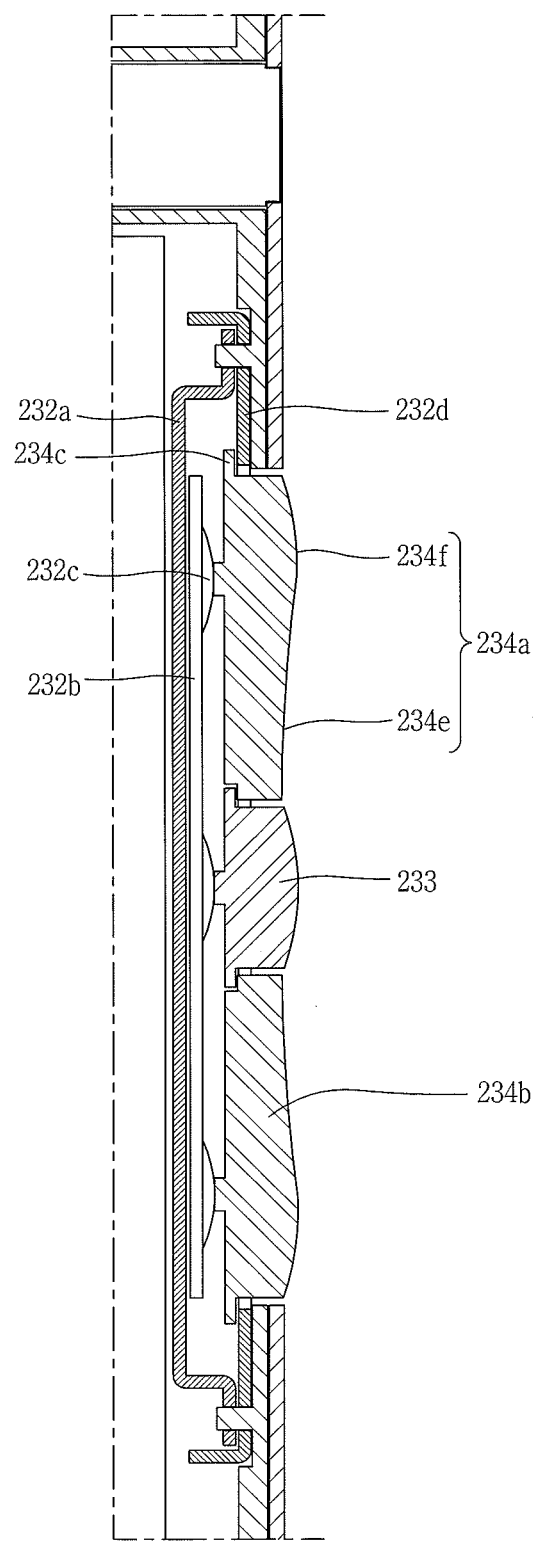

The rear surface input unit 232 according to the present disclosure may be implemented in a push input enabled form. More specifically, the rear surface input unit 232 may be configured with a mechanical or physical button, which is a relative concept to the touch screen. Hereinafter, the configuration of the rear surface input unit 232 will be described in more detail. FIG. 4 is an exploded view illustrating the mobile terminal of FIG. 3B, and FIGS. 5A and 5B are a detailed exploded view and a cross-sectional view illustrating a rear surface input unit in FIG. 4.

The circumference of the rear surface input unit 232 will be first described with reference to the accompanying drawings. A printed circuit board (PCB) 281 is incorporated in the terminal body. The printed circuit board 281 may be mounted on the front case 201 or rear case 202, or mounted on a separate structure. The separate structure may form a middle case. Hereinafter, it is described on the basis that the front case 201 or rear case 202 are configured in a separate manner, but the present disclosure may not be necessarily limited to this, and the front case 201, rear case 202 and a middle case may be also formed into an integral body.

The printed circuit board 281 is configured as an example of the controller 180 (refer to FIG. 1) for operating various functions of the mobile terminal. There may be provided a plurality of printed circuit boards 281 to perform the function of the controller 180 through their combination. Various electronic elements are mounted on the printed circuit board 281 to perform such a function.

Furthermore, the printed circuit board 281 is electrically connected to an antenna (not shown) to process wireless signals corresponding to wireless electromagnetic waves transmitted and received by the antenna. The antenna is disposed between the structure 203 and the printed circuit board 281 to mostly transmit and receive wireless signals through the rear case 202.

According to the drawing, the printed circuit board 281 may be electrically connected to the camera module 221'. A battery accommodating portion 292 for accommodating the battery 291 is formed on the rear case 202, and a battery cover 204 for covering the battery accommodating portion 292 is mounted on the case.

Furthermore, a through hole is formed on the rear case 202 and battery cover 204, respectively, and the camera module 221' is disposed to allow the user to look at the outside through the through holes. The camera module 221' is formed to capture an external image through a rear surface of the terminal.

Considering the rear surface input unit 232 again, the user input unit 232 is overlapped with the display unit in a thickness direction of the body and exposed to the rear surface rather than the lateral surface to remove a groove formed by the user input unit at a lateral surface of the body along the length direction. Hereinafter, the detailed structured of the rear surface input unit 232 and the lateral surface structure of the terminal will be described in sequence.

The rear surface input unit 232 may be disposed between the camera module 221' and the battery. The location of the rear surface input unit 232 may be a location overlapped with the display unit 251 (refer to FIG. 3A) at the front surface thereof. Through this, it may be possible to implement use feeling in which an input device is disposed on a rear surface of the display unit 251. However, the present disclosure may not be necessarily limited to this, and the location of the rear surface input unit 232 may be changed. According to the drawing, the battery cover 204 is provided with a through hole (H1) corresponding to the rear surface input unit 232. Furthermore, a through hole (H2) corresponding to the through hole (H1) may be formed at the rear case 202.

According to the drawing, a supporting member 232*a* for supporting the rear surface input unit 232 may be mounted on the rear case 202. More specifically, the supporting member 232*a* is disposed at a location corresponding to the through hole (H2), and at least part of the bottom surface of the supporting member 232*a* is open, and a line of the printed circuit board 232*b* is electrically connected to the inner and outer sides of the supporting member 232*a*. The printed circuit board 232*b* is configured with a flexible circuit board to be accommodated into a central region of the supporting member 232*a*, and switches 232*c* may be disposed at the flexible circuit board. The switches may be a dome switch, a piezoelectric switch, and the like.

According to the drawing, the rear surface input unit 232 may include a first button portion 233 and a second button portion 234 corresponding to the switches. The first button portion 233 is exposed to the outside from a rear surface of the terminal, and formed to receive a push input of the first function. The first function may be a function associated with the on/off the power or the activation of the display unit, and accordingly, the first button portion 233 may be a power key of the terminal as described with reference to FIGS. 2A and 2B.

The second button portion 234 is provided with keys 234*a*, 234*b* disposed at both sides, respectively, around the first button portion 233, and formed to receive a push input of a second function different from the first function. The second function may be a function associated with volume adjustment for audio outputted from the body of the terminal as described above.

Moreover, a guide member 232*d* for guiding the movement of the second button portion 234 is placed on the supporting member. The second button portion 234 may be disposed to be inserted into a central portion of the guide member 232*d*, and an edge portion thereof may be combined with the supporting member 232*a*, and an engagement wing 234*c* may be protruded along an outer circumferential surface of the second button portion 234 to be engaged with an inner side of the edge portion.

The first button portion 233 is formed to pass through the second button portion 234 between the keys 234*a*, 234*b*. In other words, a through hole 234*d* is formed on the second button portion 234. In this arrangement, the first button portion 233 is accommodated in the through hole 234*d* of the second button portion 234 such that a portion of the first button portion 233 is overlapped by a portion of at least one of the keys 234*a*, 234*b* to retain the first button portion 233 in the through hole 234*d*. The portion of the first button portion 234 is caught by the portion of the at least one of the keys 234*a*, 234*b* in an opposite direction to a direction that the first button portion 233 is moved by a push input. According to the drawing, the keys 234*a*, 234*b* are formed with a protruded surface as a surface exposed to the outside, and an opposite surface of the protruded surface may be formed with a planar surface. Through this, it may be possible to recognize with which key the user is brought into contact with his or her feeling.

More specifically, the keys 234*a*, 234*b* are provided with an inclined surface 234*e* inclined toward the through hole 234*d* to form a height difference between the keys 234*a*, 234*b* and the first button portion 233. The inclined surface 234*e* is a surface adjacent to the first button portion 233, which can be formed with a curved surface, among the protruded surfaces. The first button portion 233 is formed in a shape outwardly protruded than an end portion of the inclined surface 234*e*. An auxiliary inclined surface 234*f* having an opposite inclination to that of the inclined surface 234*e* is formed at a portion adjacent to the guide member on the keys 234*a*, 234*b*. Moreover, the first button portion 233 and second button portion 234 may be formed of different materials. Through the structure and material, it may be possible to facilitate differentiation between the first button portion 233 and second button portion 234.

In the above, a case where the rear surface input unit is configured with a plurality of buttons has been described, but the present disclosure may not be necessarily limited to this. For example, the rear surface input unit may be provided with a single button. Furthermore, though it is illustrated that the rear surface input unit has a plurality of buttons even in the following description, a function defined by an input to any one of the plurality of buttons may be applicable to the single button.

Figure 6A:
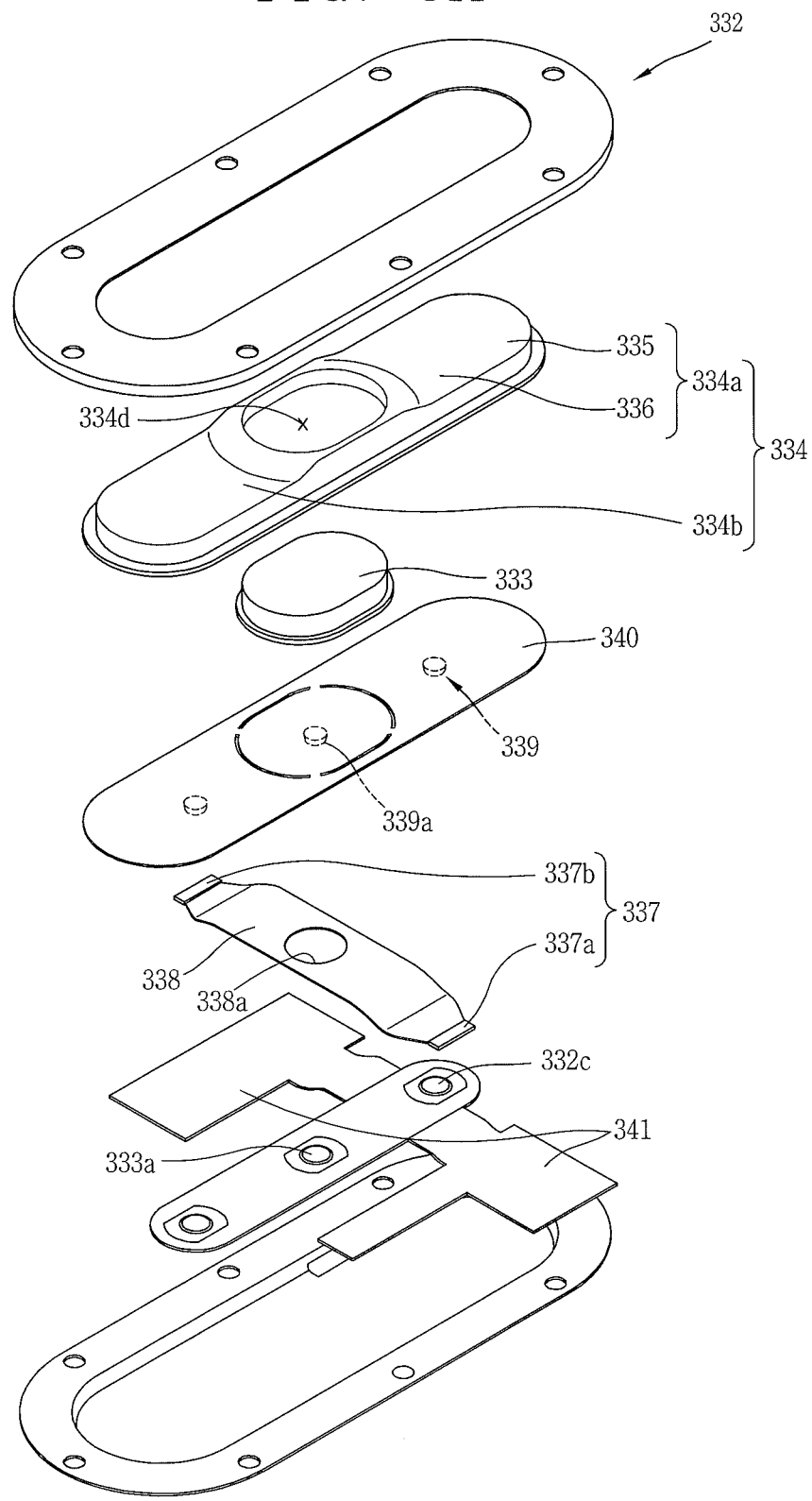
Figure 6B:
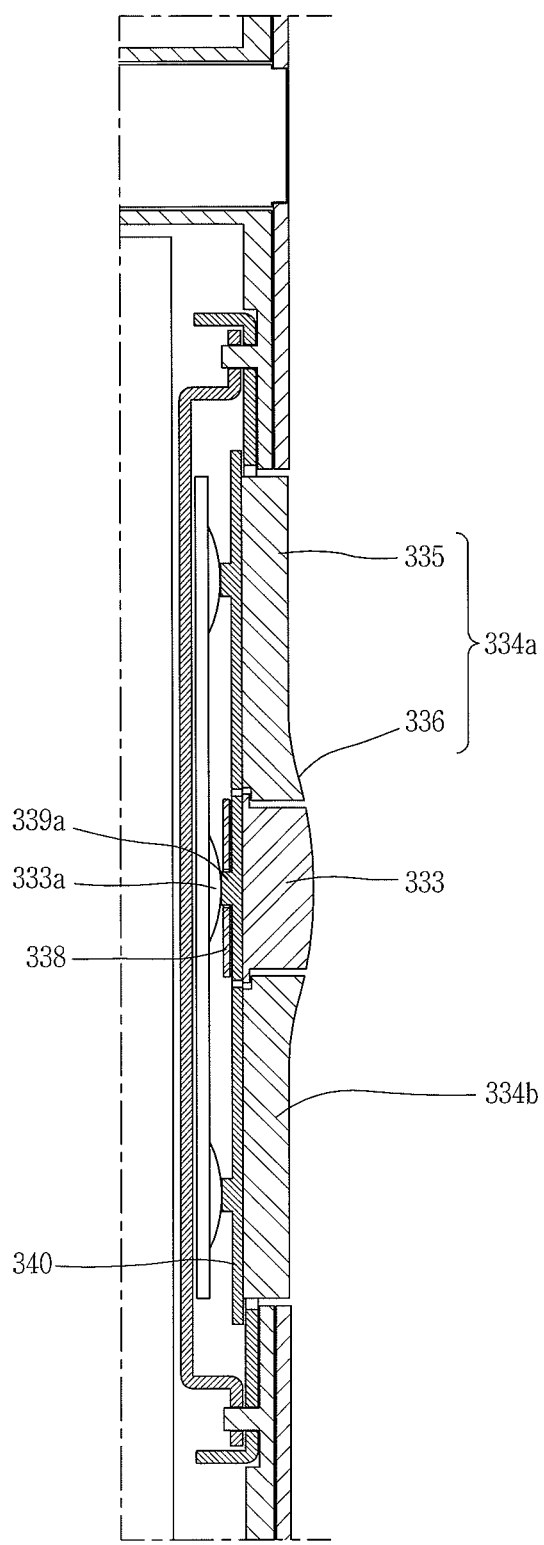

Furthermore, the rear surface input unit according to the present disclosure may not be necessarily limited to this. Hereinafter, another embodiment of the rear surface input unit will be described. FIGS. 6A and 6B are a detailed exploded view and a cross-sectional view illustrating a rear surface input unit according to another embodiment of the present disclosure.

As illustrated in the drawing, the shape of the first and the second button portion 333, 334 is formed such that the first button portion 333 is protruded, contrary to the foregoing embodiment. For example, the keys 334*a*, 334*b* of the second button portion 334 may have a planar portion 335 and an inclined portion 336, respectively.

The planar portion 335 is formed in parallel to a rear surface of the terminal body. Furthermore, a through hole 334*d* for accommodating the first button portion 333 is formed on the second button portion 334 such that the first button portion 333 is disposed between the keys 334*a*, 334*b*, and an inclined portion 336 is formed to be inclined toward the through hole 334*d* from the planar portion. In this case, the first button portion 333 is formed to be protruded from the planar portion 335 so as to be differentiated from the keys, and the inclined portion 336 is inclined in the direction protruded from the planar portion 335 such that the first button portion 333 and the keys 334a, 334b are joined to each other at their boundary. Due to such a shape, even though the first button portion 333 is partially protruded from the rear surface of the body as illustrated in the drawing, the inclined portion 336 prevents the first button portion 333 from being pushed when the rear surface of the body is brought into contact with an external object.

Furthermore, the rear surface input unit 332 may be formed to allow lighting to the outside. More specifically, the rear surface input unit 332 may include switches 332c, a light source 337, and a light guide 338.

A plurality of the switches 332c are provided and arranged in one row to correspond to the first and the second button portion 333, 334. The switches 332c, for example, a dome switch, a piezoelectric switch and the like, may be mounted on a flexible circuit board.

The light source 337, such as LED and the like, may be disposed adjacent to the switches 332c. For example, the light source 337 may include a first and a second light source 337a, 337b disposed at both sides around the row of the switches 332c. More specifically, the light sources may be disposed at both sides of a switch 333a corresponding to the first button portion 333 among the switches 332c.

The light guide 338 is formed to cover at least part of the switches 332c and connected to the light source 337 to illuminate the light of the light source 337. For example, the first and the second light source 337a, 337b are connected to both ends of the light guide 338, respectively, and the light guide 338 is disposed in the direction crossed with one row consisting of the switches 332c to cover the switch 333a corresponding to the first button portion 333.

In this case, the first button portion 333 is formed of a light-transmitting material to transmit light generated from the light source 337 to the outside. Moreover, the second button portion 334 may be formed of a non-light-transmitting material to prevent the light from being leaked out.

Furthermore, according to the drawing, a member 340 provided with a protrusion 339 protruded toward the switches 332c may be disposed at a lower portion of the first button portion 333 and second button portion 334. One surface of the member 340 is connected to the first button portion 333 and second button portion 334, respectively, and protrusions 339 corresponding to the switches 332c, respectively, are formed on the other surface thereof. In this case, a slit may be formed around the protrusion 339a corresponding to the first button portion 333. Furthermore, a through hole 338a may be formed on the light guide 338 such that the protrusion 339a corresponding to the first button portion 333 passes therethrough. Due to such a structure, a pushing force of the first button portion may be more efficiently transferred to the switch.

Figure 7A:
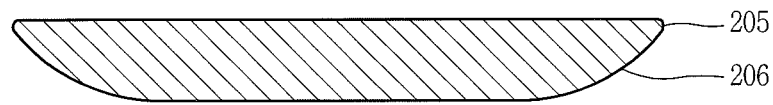
Figure 7B:
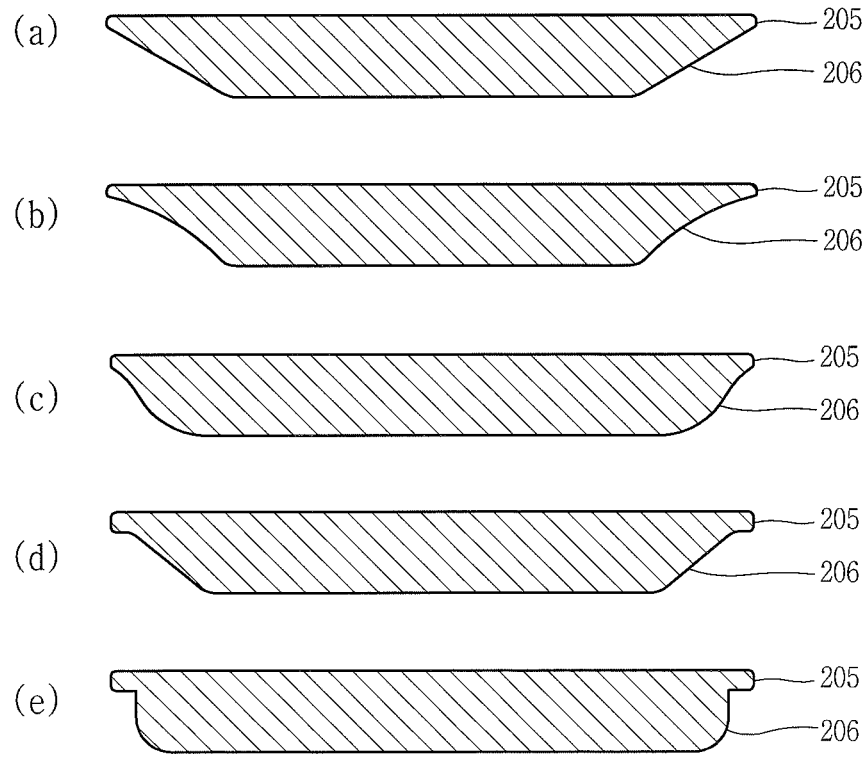

A lateral surface of the terminal may be combined with such a rear surface input unit to form a new shape. For example, referring to FIGS. 7A and 7B along with FIGS. 3A and 3B, a lateral surface of the body may include a first portion 205 and a second portion 206. FIGS. 7A and 7B are a front view illustrating the mobile terminal of FIG. 3A and conceptual views illustrating modified examples of a lateral surface thereof.

The first portion 205 is formed at an edge of the front surface, and made with a shape in which a predetermined cross section is extended along the length direction, and the second portion 206 is extended from the first portion 205 to be joined to the rear surface, and inclined against the first portion 205 (refer to 7A and 7B(a) through 7B(d)) or made to have a step against the first portion (refer to FIG. 7B(e)). Furthermore, a thickness of the first portion 205 may be formed to be less than that of the second portion 206. In other words, the first portion 205 may be formed with a very low thickness since a push key is not disposed on a lateral surface of the terminal. Through this, the display unit at a front surface thereof may be formed with a larger sized screen.

Furthermore, the second portion 206 is inclined in a direction that an area of the rear surface is smaller than that of the front surface or has a step against the first portion 205 such that the rear surface is hidden by the front surface. Even when there exists an inclination or step at a lateral surface of the terminal, a push key is not disposed at a lateral surface of the terminal, thereby allowing a shape in which a predetermined cross section is extended.

More specifically, the second portion 206 may be a curved surfaced having an inclination as illustrated in FIG. 7A or a planar surface having an inclination as illustrated in FIG. 7B(a). Furthermore, the second portion 206 may be a curved surface shape that is concaved toward an inner portion of the terminal as illustrated in FIG. 7B(b). Furthermore, the second portion 206 may be a shape having a step to the first portion as illustrated in FIG. 7B(c) through 7B(e). The second portion 206 may be a curved surface having the step as illustrated in FIG. 7B(c), or may be an inclined surface having the step as illustrated in FIG. 7B(d). Otherwise, both the first and the second portion may be formed with a shape having a step with no inclination as illustrated in FIG. 7B(e). According to the present disclosure, there is presented a lateral surface structure of the terminal in a new shape in connection with the rear surface input unit.

Moreover, the rear surface input unit allows a lateral surface structure of the terminal in another shape, and it will be described in more detail with reference to FIGS. 8A and 8B.

Figure 8A:
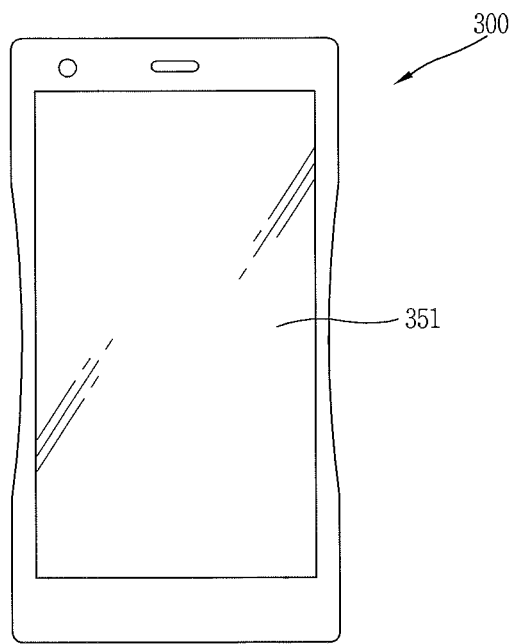

FIG. 8A is a plan view illustrating another example of a mobile terminal associated with the present disclosure.

According to the drawing, both lateral surfaces of the mobile terminal 300 may have a curved outer shape having a curvature concaved toward the display unit 351 of the terminal. Since a push input to the terminal is enabled using the rear surface input unit, push keys can be removed from a lateral surface of the terminal, thereby allowing a curved lateral surface shape. Due to such a structure, it may be possible to enhance the user's grip feeling to the terminal.

Moreover, a squeeze sensor (not shown) is disposed at the curved lateral surface, and thus the terminal may be configured to sense the user's squeeze operation. The squeeze sensor is formed to sense a pressure applied by the user, and it is recognized as a squeeze operation when both lateral surfaces of the terminal are pressurized by the user. In this case, when the user squeezes both lateral surfaces of the terminal, it may be possible to perform a function such as lock release, switching to a home screen page, volume up/down, and the like.

Figure 8B:
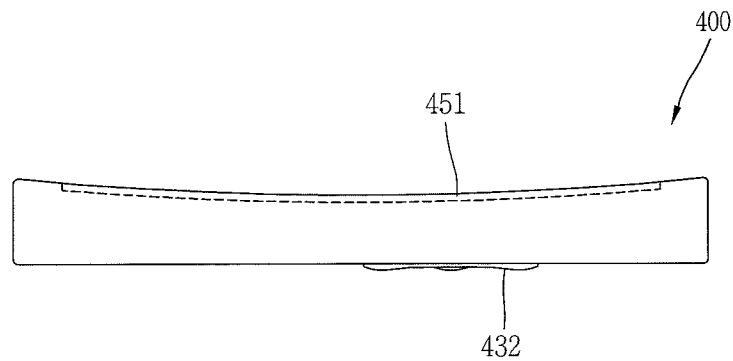

FIG. 8B is a side view illustrating still another example of a mobile terminal associated with the present disclosure.

Referring to the drawing, the display unit 451 of the mobile terminal 400 is provided with a flexible display, and thus a main surface displaying the screen (front surface of the display unit) is formed with a curved surface.

The flexible display is a display device in which functions are properly carried out without the loss of display characteristics even when curved or bent, and it may be implemented using a flexible material, for example, plastic film, as a substrate thereof.

More specifically, the front case of the terminal body is bent such that the front surface is concave, and the display unit 451 is bent in a concave manner to correspond to the shape. In other words, the front surface of the terminal has a curvature. On the contrary, the rear surface of the terminal is formed with a planar surface, and the rear surface input unit 432 is disposed on the planar surface.

The lateral surface of the terminal may be formed such that the thickness varies along the length direction of the terminal to correspond to the structure. More specifically, the lateral surface of the terminal is formed in such a shape in which an upper side thereof is curved and a lower side thereof is linear. However, the present disclosure may not be necessarily limited to this, and it may be also possible to have a structure in which the lateral surface of the terminal forms a curve as a whole, and the rear surface is formed with a curved surface as the same as the front surface.

In this manner, the arrangement of a button may be removed from the lateral surface of the terminal, and a rear surface input unit may be used, thereby implementing a new structure of the terminal.

In the above, the structure of a rear surface input unit has been primarily described, but the control operation of the rear surface input unit capable of such as push input may be also modified in various forms. Hereinafter, a modified example of the control operation through the rear surface input unit will be described with reference to FIGS. 9 through 11. In the modified example or embodiment which will be described below, the same or similar reference numerals are designated to the same or similar configurations, and the description thereof will be substituted by the earlier description. However, reference numerals for the rear surface input unit may be designated based on FIGS. 5A and 5B, but they may be a rear surface input unit in FIGS. 6A and 6B.

Figure 9:
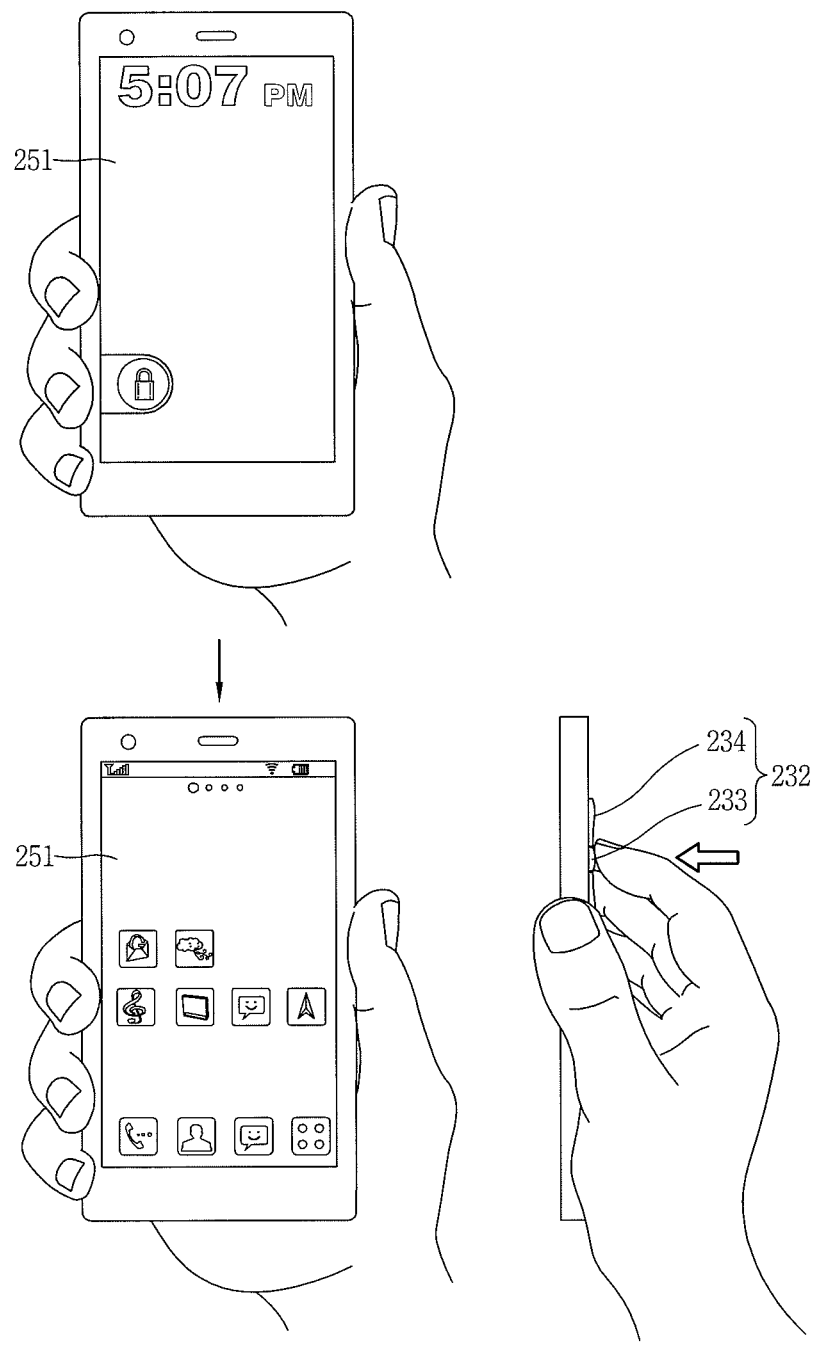

Referring to FIG. 9, a lock screen may be displayed on the display unit 251. For instance, in a state that the lock screen is displayed (or in a lock mode), the display unit 251 may be in a state that only a touch input associated with an operation for releasing the lock state is enabled.

In this state, when a push input is applied to the rear surface input unit 232, the lock screen may be switched to a home screen page. Here, the home screen page may be expressed as an idle screen, and becomes a state of allowing a touch input to the whole region of the display unit 251. In this case, the rear surface input unit 232 may be a hot key for performing lock release.

The home screen page can be displayed on the display unit 251 when the terminal is in an idle state. More specifically, icons or widgets of the application installed in the mobile terminal may be displayed on the home screen page. Furthermore, a plurality of home screen pages may be configured therein according to the user's selection or the number of applications installed in the terminal.

In this manner, switching to a home screen page may be implemented in the form of returning to the home screen page in a state that a specific application is carried out while not in a lock mode. For example, when the rear surface input unit 232 is pushed in a state that a webpage is displayed on the display unit 251, it can be returned to the home screen page. In other words, the rear surface input unit 232 may be operated as a home key performing a control command for returning to the home screen page. Moreover, the operation as a hot key and the operation as a home key may be carried out by the same button (for example, first button portion 233 or second button portion 234) of the rear surface input unit 232.

Figure 10:
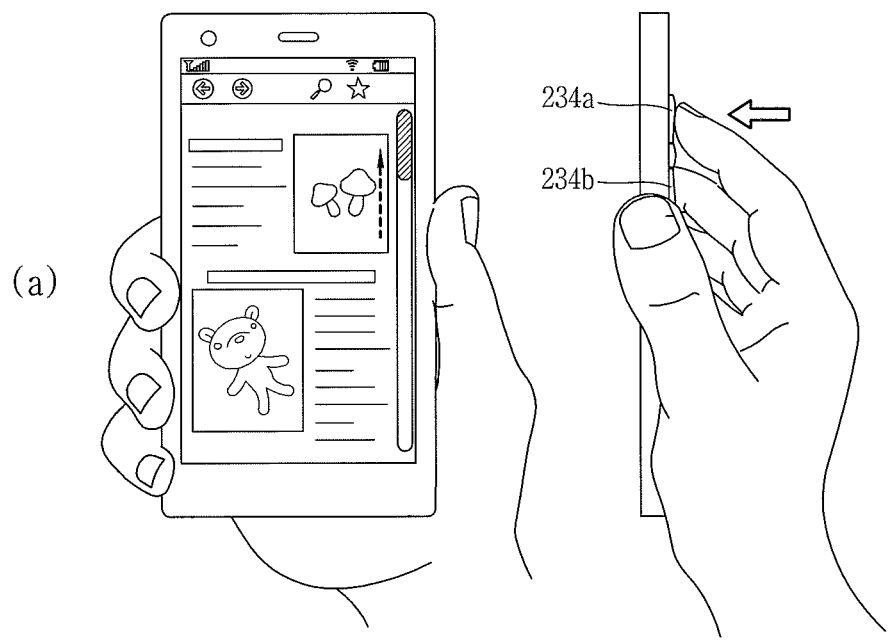
Figure 10:
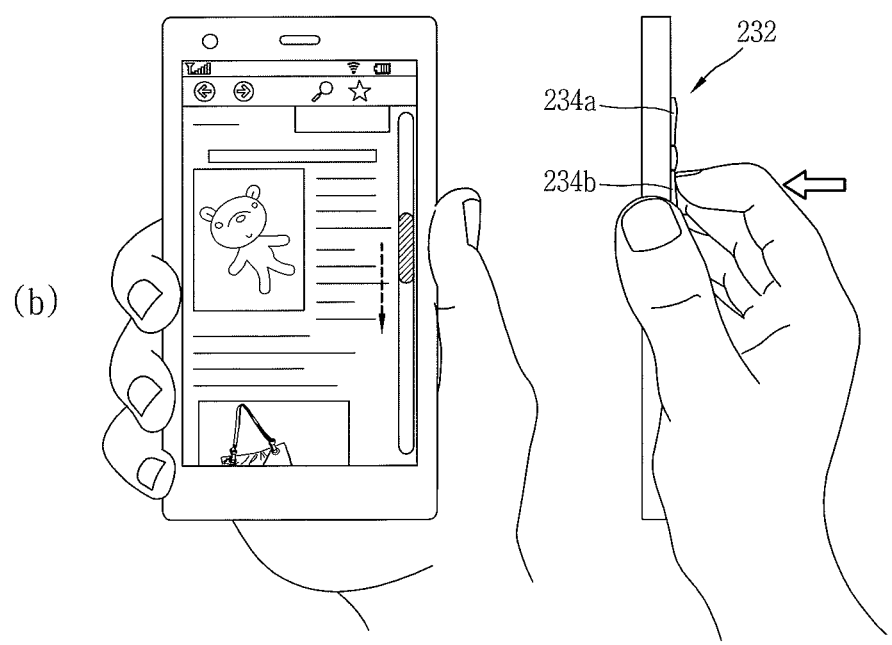

Referring to FIG. 10, the second function defined by the second button portion 234 may be a scroll for the output information of the display unit.

For example, a webpage containing images, text, icons and the like is displayed on the display unit, and a control command for the webpage is received from the rear surface input unit 232. More specifically, when keys 234a, 234b are pushed to the second button portion 234, the webpage is scrolled. In this case, either one 234a of the keys 234a, 234b may correspond to scroll up, and the other one 234b of the keys may correspond to scroll down. In this case, the terminal may be formed to change the scroll up/down to each other when the terminal body is turned over. For example, a gym sensor or the like may be provided in the terminal to sense whether the top/down of the terminal is placed normally or reversed, thereby allowing the keys 234a, 234b to receive different functions according to the arrangement direction of the terminal. The definition change of key input according to the direction of the terminal may be also applicable to other embodiments of the present disclosure such as volume up/down, scroll up/down, and the like.

Furthermore, when a touch input through the display unit and an input through the user input unit are applied at the same time, it may be configured such that either one of the input through the user input unit and the touch input has a priority. For example, when the user input unit is scroll down and an input corresponding to the scroll down is applied to the display unit, the controller of the terminal performs scroll down. However, the priority may be applicable in the same manner to other embodiments of the present disclosure.

For another example, the user may push the rear surface input unit 232 to move an object displayed on the display unit 251, for example, a cursor or pointer located at the icon or the like. In this case, another key of the rear surface input unit 232 may be pushed subsequent to moving the cursor or pointer, thereby performing the selection of an icon of the application, a specific key (text or numerical input key, call key, end key, etc.) of the virtual keyboard, and a specific item of the information list indicated by the cursor or pointer.

Furthermore, when the user clicks the first button portion 233 in a webpage mode, namely, applies a push input, the webpage of the display unit 251 may be switched to a home screen page.

Figure 11:
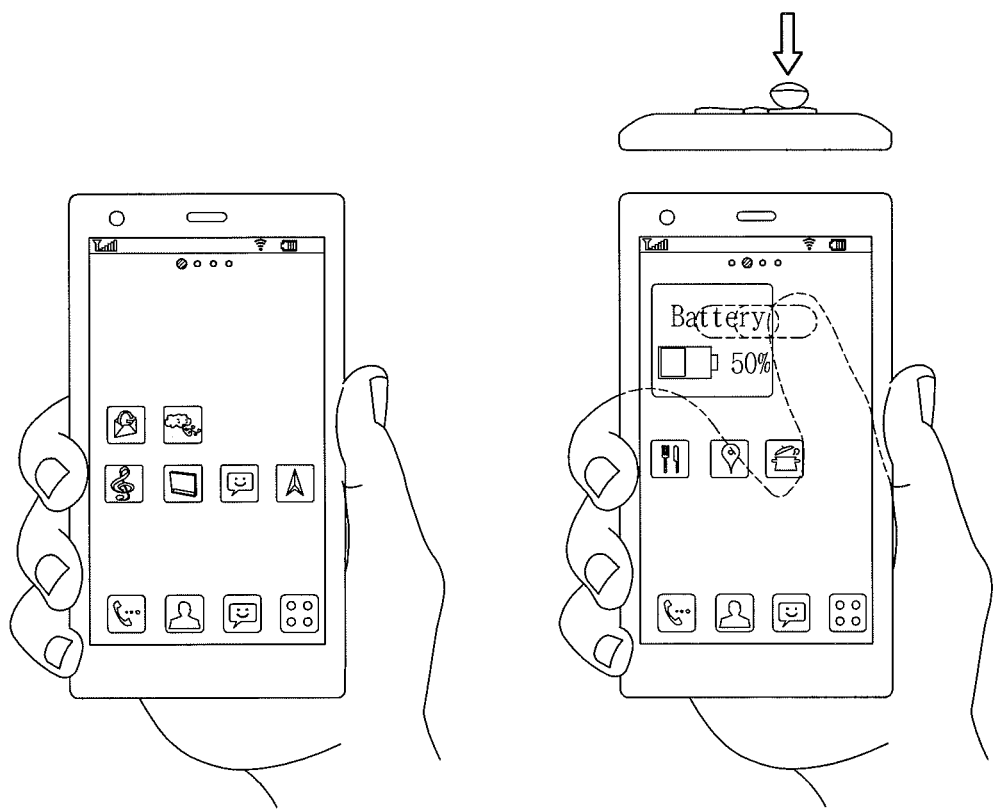

Referring to FIG. 11, the rear surface input unit 232 may be arranged in the width direction of the terminal body. More specifically, the keys of the second button portion 234 is arranged in the width direction of the body around the first button portion 233.

In this case, the second function defined by the second button portion 234 may be a function associated with horizontal movement on the output information of the display unit 251.

For example, when the home screen page is displayed on the display unit and a plurality of home screen pages are provided, the switching of a home screen page may be carried out by a push input to the keys of the second button portion 234. More specifically, the home screen may be page-switched to left side when the left key of the keys 234a, 234b is pushed, and page-switched to the right side when the right key is pushed.

In this example, it has been described a case where the rear surface input unit 232 is arranged in the width direction, but it may be modified to another form. For example, when it is configured that the rear surface input unit 232 is arranged in the length direction and the terminal performs scroll using the rear surface input unit (refer to FIG. 10), the same control as the present example may be applicable when the terminal is rotated by 90 degrees for the user to use it in the landscape direction.

In the above, it has been described a case where the rear surface input unit is a push type, but the rear surface input unit may be modified in various forms. FIGS. 12A through 12E are rear views illustrating a mobile terminal associated with another embodiment of the present disclosure, and FIG. 13 is a cross-sectional view illustrating the mobile terminal of FIG. 12A.

According to the drawing, the rear surface input unit may be at least one of a touch pad module (TP), a track ball module (TR), an optical sensor module (OS), a wheel key module (WH) and a fingerprint scanner module (FI). Furthermore, the terminal may perform the foregoing control operations using the touch pad module (TP), track ball module (TR), optical sensor module (OS), wheel key module (WH) and fingerprint scanner module (FI).

For example, when a wheel key of the wheel key module (WH) is rotated or a track ball of the track ball module (TR) is rotated, it may be possible to perform scroll for the output information of the display unit or volume control for the audio outputted from the body according to the rotational direction. Furthermore, the touch pad module (TP), optical sensor module (OS) and fingerprint scanner module (FI) or the like may perform scroll for the output information of the display unit or volume control for the audio outputted from the body by a drag operation to the module.

Figure 12A:
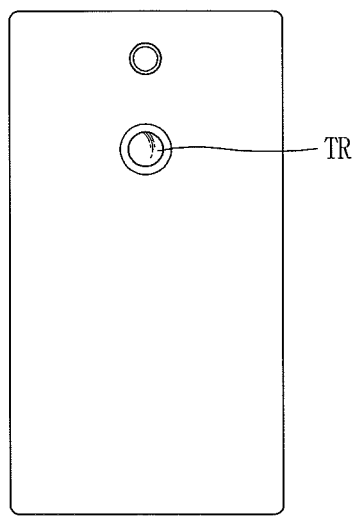
Figure 12B:
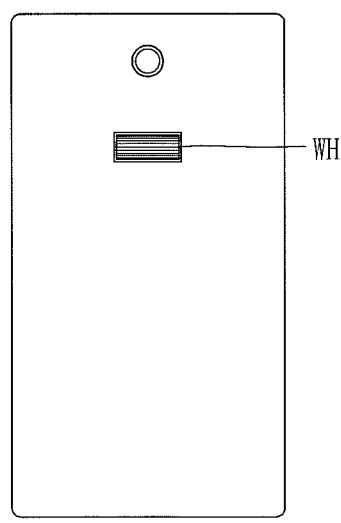
Figure 12C:
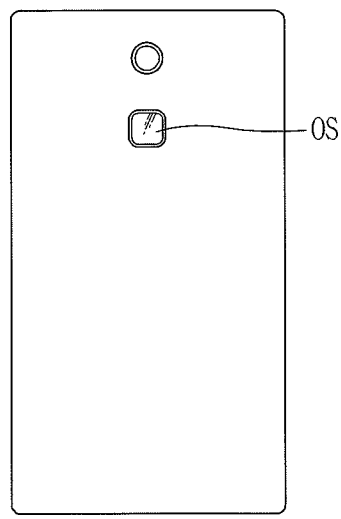
Figure 12D:
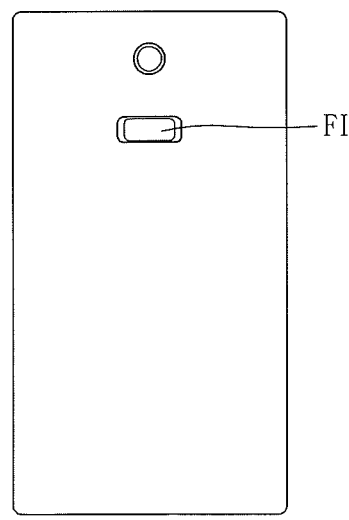
Figure 12E:
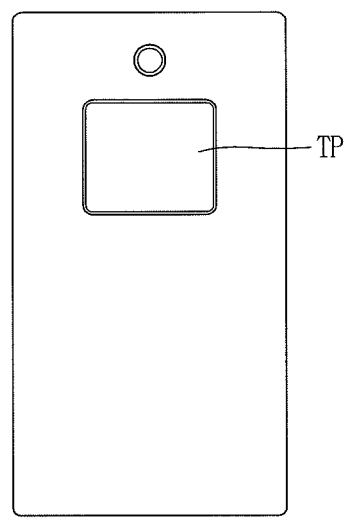
Figure 13:
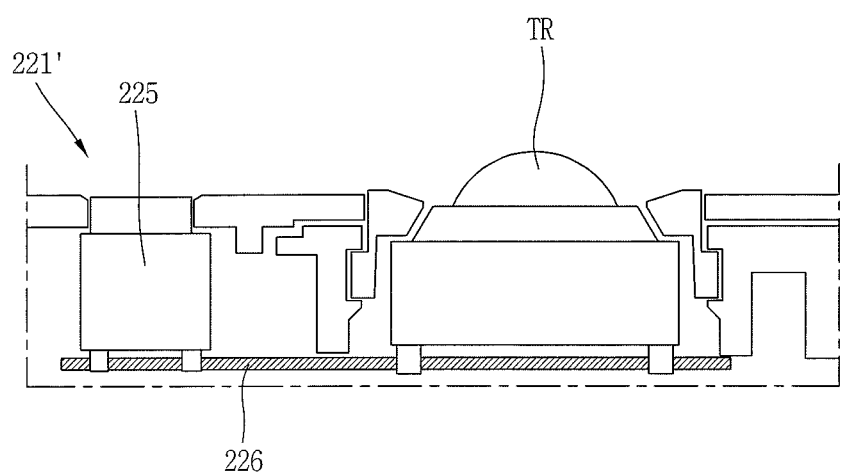

Furthermore, the touch pad module (TP) in FIG. 12E may be configured with a touch screen. For example, the touch pad module (TP) may include a display unit (not shown) displaying simple information even in a state that the terminal body is reversed. The display unit may include an organic light emitting diode (OLED), a flexible display, a three-dimensional (3D) display, or the like.

Simple information displayed on the display unit may be a key button which is an object of the input through the touch pad module (TP). However, the present disclosure may not be necessarily limited to this. For example, the display unit may display information in connection with the operation of the terminal regardless of an input through the touch pad module (TP). More specifically, count down information may be displayed during camera capture. When the user pushes a capture button, count down information may be displayed in the order of capture, 3, 2, 1 on the display unit. For another example, information displayed on the display unit may be indicator information indicating a call/message reception while receiving a call/message, various images shown to the counter part, or the like.

Furthermore, the rear surface input unit may be incorporated into the camera module 221'. Referring to FIG. 13, the camera module 221' may include a capture element 225 and a frame 226. The capture element 225 may be formed in such a form that a semiconductor chip for image sensing is mounted on the sensor board, and mounted on the frame 226.

The semiconductor chip may be implemented by a charge-coupled device (CCD), a complementary metal oxide semiconductor (CMOS) or the like for converting light into a charge to obtain an image. A lens assembly may be disposed at a front surface of the semiconductor chip. In this manner, the capture element 225 may include an optical system having a lens, an image sensor, a circuit unit for processing the sensed light signal to obtain an image, and the like within one module.

According to the drawing, the track ball module (TR) is mounted along with the capture element on the frame 226. Through this, the track ball module (TR) and camera module 221' may be configured with one integrated module. However, the present disclosure may not be necessarily limited to this, and at least one of the touch pad module (TP), optical sensor module (OS), wheel key module (WH) and fingerprint scanner module (FI) may be mounted along with the capture element on the frame.

Hereinafter, a user interface or user experience (hereinafter, commonly referred to as a "user interface") which is useful when the rear surface input unit is a touch pad module (TP), track ball module (TR), optical sensor module (OS), wheel key module (WH) or fingerprint scanner module (FI) will be described. However, the following user interfaces may not be necessarily limited to the touch pad module or the like, and may be also applicable to a case where the rear surface input unit is a push button.

Figure 14A:
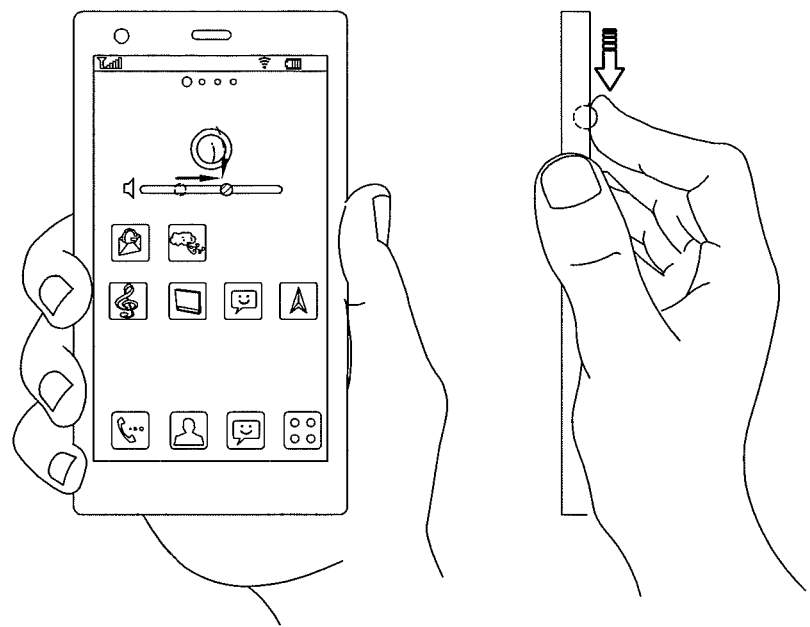
Figure 14B:
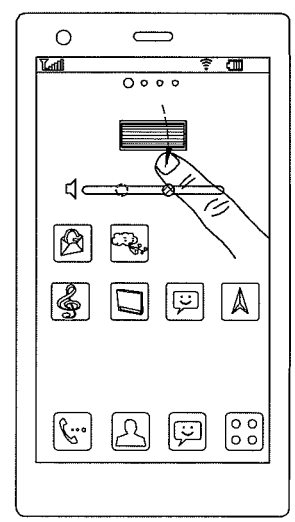

FIGS. 14A and 14B are conceptual views illustrating a user interface associated with an interlocking between the rear input unit and the display unit.

Referring to FIG. 14A, an icon corresponding to the location or kind of the user input unit may be displayed on the display unit. For example, in case of a track ball module (TR), an icon with a track ball shape may be displayed on the display unit.

The icon may be displayed when the user applies an input to the track ball module (TR) in a state of not being displayed on the display unit (for example, when a home screen page is displayed). In other words, when volume control is carried out using the track ball module (TR), the icon of a track ball is displayed along with a volume bar on the display unit if the user makes contact with the track ball module to rotate the track ball.

In this case, the icon may be changed in its shape in connection with an input manipulation applied to the user input unit or displays new information. For example, when the track ball is rotated, the icon of a track ball displayed on the display unit is rotated at the same time. Such a control operation may be also applicable to other forms of input structures in which the icon of a wheel key is rotated in a concurrent manner according to the rotation of the wheel key in case of the wheel key module or the like.

For another example, a touch input to the icon may be processed with a control command corresponding to an input to the user input unit.

Referring to FIG. 14B, for example, when an icon corresponding to the wheel key is displayed, a control command defined for the wheel key module (WH) can be processed while the icon is rotated if flicking is applied to the icon of the display unit other than an input to the wheel key module (WH). For an example of the case, volume increases when flicking is applied thereto in the direction from the upper end to the lower end of the icon, and volume decreases when flicking is applied thereto in the opposite direction.

However, the present disclosure may not be necessarily limited to this, and for example, an input to the icon may be processed with a different control command from the input to the rear surface input unit. For example, when a long touch is applied to the icon, the volume may be switched to mute.

The operation of the present embodiment may be also applicable to other forms of input structures. For example, when an icon corresponding to the touch pad is displayed on the display unit, a control command processed by an input to the touch pad module at a rear surface of the terminal may be processed with an input to the icon of the display unit.

Figure 15:
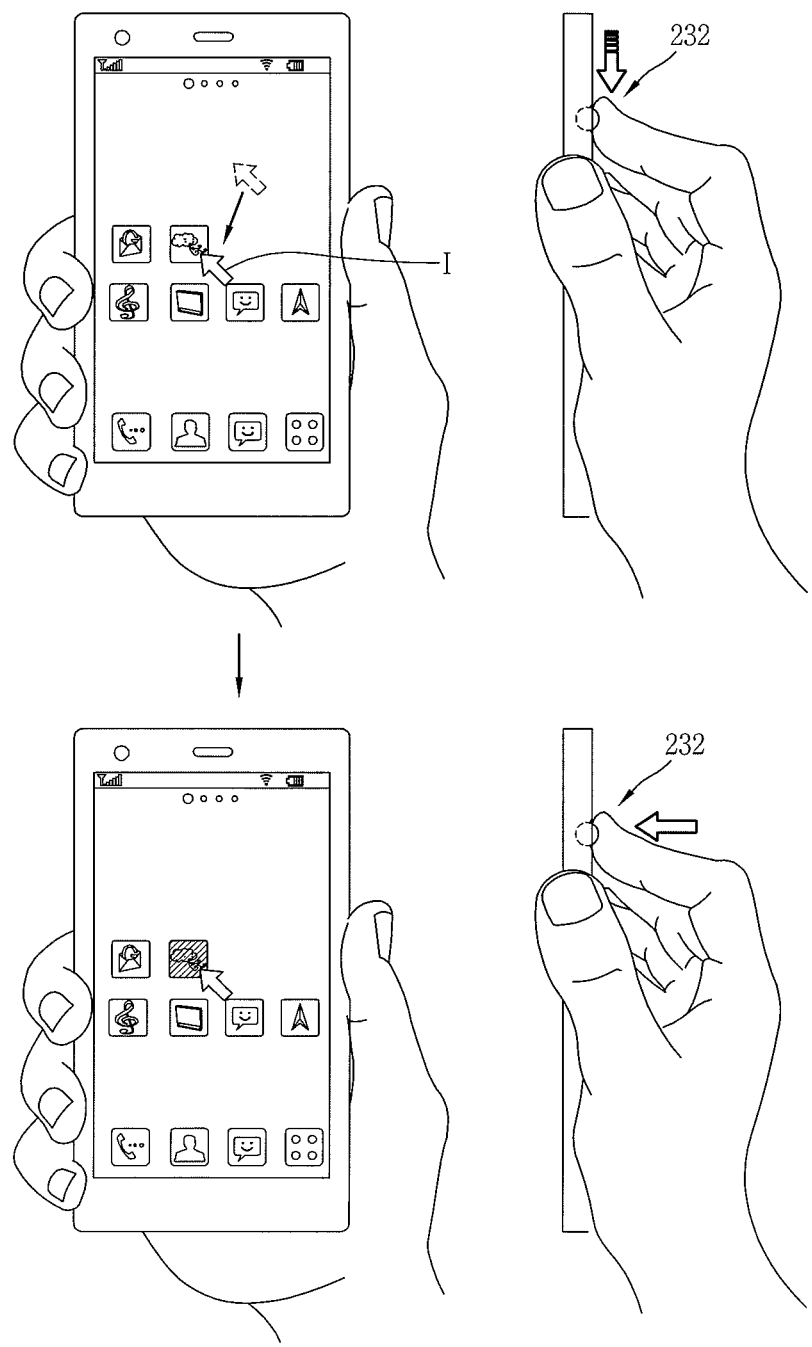

FIG. 15 is a conceptual view illustrating a user interface associated with an indicator displayed on the display unit.

According to the drawing, an indicator (I) moved by an input applied to at least one of the touch pad module, track ball module, optical sensor module, wheel key module and fingerprint scanner module may be displayed on the display unit.

In this case, the selection of the icon of an application indicated by an indicator may be carried out by moving the indicator (I) and then pushing the rear surface input unit 232. To this end, the touch pad module, track ball module, optical sensor module, wheel key module, fingerprint scanner module, and the like may be configured to allow a push input.

For a more specific example, it may be possible to have a structure in which the frame is configured in a movable manner in FIG. 13, and a dome switch is disposed at a lower portion of the frame to sense a push input to the frame. The user may enter various forms of control commands such as pushing the track ball, rotating the track ball or the like.

Furthermore, according to the present disclosure, there is proposed a peculiar structure and user interface in case where the rear surface input unit is a fingerprint scanner module (FI). Hereinafter, a case where the rear surface input unit is a fingerprint scanner module (FI) will be described in more detail.

Hereinafter, for the sake of convenience of explanation, it is illustrated that the rear surface input unit is configured with a single button. However, the present disclosure may not be necessarily limited to this. For example, the rear surface input unit may be provided with a plurality of buttons, and each button may be set to a button for receiving at least one of functions which will be described below.

The rear surface input unit may be formed to scan a fingerprint from the user's finger applying the push along with a push input applied thereto. More specifically, the fingerprint scanner module (FI) is mounted on a surface of the button (upper surface in this example), and a fingerprint of the finger brought in contact with the button is recognized through this. The button is formed to be slidable by the push, and the switch is pressurized through this. The controller senses a push input when the switch is pressurized, and processes the corresponding control command.

However, the present disclosure may not be necessarily limited to this. For example, the push button may be replaced with a touch button. More specifically, a fingerprint scanner module may be disposed on an upper surface of the touch button. Accordingly, a push input through the push button may be replaced with a touch input through the touch button in an embodiment which will be described below. Moreover, the rear surface input unit in the present embodiment may be a front surface input unit disposed on a front surface of the terminal.

The fingerprint scanner module (FI) may be used as a function key associated with power on/off. For example, when a button of the rear surface input unit is pushed in a state that the power of the terminal is turned off, fingerprint recognition is carried out while power is supplied to the fingerprint scanner module. The terminal determines whether or not the recognized fingerprint corresponds to the user's fingerprint, and continues to progress power on and terminal booting. In this manner, a power-on command of the terminal is carried out in two steps (fingerprint scanner power on and terminal power on), thereby reducing current consumption. In other words, a security function based on fingerprint recognition may be provided to the power on operation, but the fingerprint scanner module can be turned off along with the terminal body without being held in a power-on state.

Moreover, the above case is a case where the user turns on the terminal, and thus the display unit may immediately enter a home screen page without passing through a lock screen when the power on and terminal booting is completed.

Furthermore when the recognized fingerprint does not correspond to the user's fingerprint, the power on and terminal booting will be terminated. In this case, the terminal may display a warning message with no user's fingerprint. The warning message may be implemented in the form of providing a lighting effect for a predetermined period of time on the front surface of the terminal or outputting a sound effect.

For another example, when a push input is applied to the rear surface input unit in a lock mode in which the lock screen is displayed on the display unit 251, the lock screen may be switched to a home screen page while releasing the lock. In this case, the rear surface input unit may be a hot key for performing lock release.

However, the lock release is carried out only when a fingerprint scanner performs fingerprint recognition for an object brought into contact with the fingerprint scanner for a push and the recognized fingerprint corresponds to a prestored user's fingerprint. During the fingerprint recognition, a notification message such as "fingerprint is being recognized" may be displayed on the display unit of the terminal to indicate it.

When the rear surface input unit performs a volume control function, the operation associated with the foregoing fingerprint recognition may be applicable all the functions that have been described with reference to FIGS. 9 through 11 as a prior condition of each function such as limiting volume control with fingerprint recognition.

According to the present disclosure, the user input unit may be disposed at a rear surface of the terminal, thereby allowing the front display to be formed with a larger sized screen. Furthermore, through this, a new design such as providing a steep slope on a lateral surface of the terminal or the like may be implemented through this. Moreover, it may be possible to implement a new type of user interface.

Furthermore, according to the present disclosure, the user can distinguish each button using a tactile feeling or the like through the shape of the user input unit without seeing it.

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal comprising:
   a terminal body having a front surface, a lateral surface and a rear surface;
   a touch screen disposed at the front surface;
   a rear input unit disposed at the rear surface, the rear input unit including a button and a fingerprint sensor mounted on a surface of the button; and
   a controller configured to:
   activate the touch screen in response to an input being applied to the button, wherein the input is applied to the button in a state where the touch screen is deactivated and the mobile terminal is in a locked state,
   display a lock screen on the activated touch screen, and release the locked state of the mobile terminal and switch the lock screen to a home screen in response to a fingerprint recognized through the fingerprint sensor corresponding to a preset fingerprint,
wherein the rear input unit is operated as a home key performing a control command for returning to a home screen page in an unlocked state,
wherein the touch screen occupies most of the front surface,
wherein the rear input unit is overlapped with the touch screen in a thickness direction of the terminal body, and
wherein the rear surface is formed to be planar, and a portion of the lateral surface is curved to be connected to the rear surface.

2. The mobile terminal of claim 1, wherein the fingerprint sensor recognizes a fingerprint of a finger applying the input to the button.

3. The mobile terminal of claim 1, wherein the rear input unit further includes a dome switch configured to be pressed by the button.

4. The mobile terminal of claim 1, wherein the portion of the lateral surface is a curved surface being joined to the rear surface.

5. The mobile terminal of claim 1, wherein the terminal body is a bar-type terminal body including the front surface and the rear surface.

6. The mobile terminal of claim 1, wherein the controller is further configured to:
display, on the activated touch screen, a graphic user interface (GUI) of a previously reproduced music reproduction application executing when the touch screen was deactivated.

7. The mobile terminal of claim 1, wherein when the touch screen is switched from a deactivated state to an activated state, the controller is further configured to display an execution screen of an application executing when the touch screen was deactivated on the touch screen.

8. The mobile terminal of claim 1, wherein the controller is further configured to perform a function associated with power on of the mobile terminal when the rear input unit is pushed in a state that power of the mobile is turned off.

9. The mobile terminal of claim 1, wherein when the button is pushed in a state that the power of the terminal is turned off, the fingerprint sensor recognizes a fingerprint, and
wherein the controller is further configured to determine whether or not the recognized fingerprint corresponds to the preset fingerprint, and continue to progress of the power on of the mobile terminal when the recognized fingerprint corresponds to the preset fingerprint.

10. The mobile terminal of claim 1, wherein the terminal body includes a first portion and a second portion,
wherein the first portion is formed at an edge of the front surface, and made with a shape in which a predetermined cross section extends along a length direction of the terminal body, and
wherein the second portion extends from the first portion to be joined to the rear surface, and curved against the first portion.

11. The mobile terminal of claim 1, wherein the terminal body includes a front case and a rear case, and
wherein a battery accommodating portion for accommodating a battery is formed on the rear case, and a battery cover for covering the battery accommodating portion is mounted on the rear case.

12. The mobile terminal of claim 11, wherein a camera module is disposed on the rear surface, and
wherein the battery cover is provided with a first through hole corresponding to the rear input unit and a second through hole corresponding to the camera module.

13. The mobile terminal of claim 1, wherein the rear input unit is configured to receive a push input and a touch input.

14. A mobile terminal comprising:
a terminal body having a front surface, a lateral surface and a rear surface;
a touch screen disposed at the front surface;
a rear input unit disposed at the rear surface, the rear input unit including a button and a fingerprint sensor mounted on a surface of the button; and
a controller configured to process one or more functions corresponding to an input applied to the rear input unit,
wherein the touch screen occupies most of the front surface,
wherein the rear input unit is overlapped with the touch screen in a thickness direction of the terminal body, and
wherein the rear surface is formed to be planar, and a portion of the lateral surface is curved to be connected to the rear surface.

15. The mobile terminal of claim 14, wherein the portion of the lateral surface is a curved surface being joined to the rear surface.

16. The mobile terminal of claim 15, wherein the terminal body includes a first portion and a second portion,
wherein the first portion is formed at an edge of the front surface, and made with a shape in which a predetermined cross section extends along a length direction of the terminal body, and
wherein the second portion extends from the first portion to be joined to the rear surface, and curved against the first portion.

17. The mobile terminal of claim 14, wherein the terminal body includes a front case and a rear case, and
wherein a battery accommodating portion for accommodating a battery is formed on the rear case, and a battery cover for covering the battery accommodating portion is mounted on the rear case.

18. The mobile terminal of claim 17, wherein a camera module is disposed on the rear surface, and
wherein the battery cover is provided with a first through hole corresponding to the rear input unit and a second through hole corresponding to the camera module.

19. The mobile terminal of claim 14, wherein the rear input unit is configured to receive a push input and a touch input.

20. The mobile terminal of claim 14, wherein a supporting member is mounted at the terminal body to support the rear input unit, the supporting member overlapping at least a part of the rear input unit.

21. A mobile terminal comprising:
a terminal body having a front surface and a rear surface;
a touch screen disposed at the front surface;
a rear input unit disposed at a planar surface of the rear surface, the rear input unit including a button and a fingerprint sensor mounted on a surface of the button; and
a controller configured to process one or more functions corresponding to an input applied to the rear input unit,
wherein the touch screen occupies most of the front surface,
wherein the rear input unit is overlapped with the touch screen in a thickness direction of the terminal body, and
wherein the rear input unit is provided with a single button.

22. The mobile terminal of claim 21, wherein a lateral surface is curved to be connected to planar surface of the rear surface.

23. The mobile terminal of claim 22, wherein a portion of the lateral surface is a curved surface being joined to the planar surface of the rear surface.

24. The mobile terminal of claim 23, wherein the terminal body includes a first portion and a second portion,
- wherein the first portion is formed at an edge of the front surface, and made with a shape in which a predetermined cross section extends along a length direction of the terminal body, and
- wherein the second portion extends from the first portion to be joined to the rear surface, and curved against the first portion.

* * * * *